(12) United States Patent
Lee et al.

(10) Patent No.: US 10,200,679 B2
(45) Date of Patent: Feb. 5, 2019

(54) EMBEDDED SYSTEM, FAST STRUCTURED LIGHT BASED 3D CAMERA SYSTEM AND METHOD FOR OBTAINING 3D IMAGES USING THE SAME

(71) Applicant: RESEARCH & BUSINESS FOUNDATION SUNGKYUNKWAN UNIVERSITY, Suwon-si (KR)

(72) Inventors: Suk-han Lee, Yongin-si (KR); Atif Muhammad, Suwon-si (KR); Kuk-jin Han, Seongnam-si (KR)

(*) Notice: Subject to any disclaimer, the term of this patent is extended or adjusted under 35 U.S.C. 154(b) by 123 days.

(21) Appl. No.: 15/180,024

(22) Filed: Jun. 11, 2016

(65) Prior Publication Data
US 2016/0366397 A1   Dec. 15, 2016

(30) Foreign Application Priority Data
Jun. 12, 2015   (KR) .................. 10-2015-0083122

(51) Int. Cl.
| | |
|---|---|
| *G01B 11/25* | (2006.01) |
| *G01S 17/46* | (2006.01) |
| *G01S 17/89* | (2006.01) |
| *G01S 7/491* | (2006.01) |
| *H04N 13/204* | (2018.01) |
| *H04N 13/296* | (2018.01) |

(52) U.S. Cl.
CPC ....... *H04N 13/296* (2018.05); *G01B 11/2513* (2013.01); *G01S 7/4911* (2013.01); *G01S 17/46* (2013.01); *G01S 17/89* (2013.01); *H04N 13/204* (2018.05)

(58) Field of Classification Search
CPC .......... H04N 13/0296; H04N 13/0203; G01B 11/2513; G01S 7/4911; G01S 17/46; G01S 17/89
See application file for complete search history.

(56) References Cited

U.S. PATENT DOCUMENTS

| | | | | |
|---|---|---|---|---|
| 5,870,136 | A  * | 2/1999 | Fuchs ...................... | G01S 5/16 348/169 |
| 2007/0229850 | A1 * | 10/2007 | Herber ................... | G01B 11/25 356/604 |
| 2009/0009723 | A1 * | 1/2009 | Keller ................ | G02B 26/0833 353/31 |

* cited by examiner

*Primary Examiner* — Michael E Teitelbaum
(74) *Attorney, Agent, or Firm* — Jongkook Park (57) ABSTRACT

Disclosed are an embedded system, a fast 3D camera system based on structured light, and a method for acquiring 3D images using the system. The embedded system includes a pattern generation module for generating the pattern in real time and a camera trigger module for converting a camera synchronization signal into a trigger signal and transmitting the signal to a camera. A transform module for transforming the pattern into a video signal and a communication module for receiving a command for projecting patterns and capturing images may be further included. The fast 3D camera system based on structured light includes an embedded system for generating a pattern in real time upon receiving a command for projecting patterns and capturing images, a projection device for projecting the pattern, and a camera for capturing the image of an object onto which the pattern is projected.

8 Claims, 8 Drawing Sheets

EMBEDDED SYSTEM, FAST STRUCTURED LIGHT BASED 3D CAMERA SYSTEM AND
METHOD FOR OBTAINING 3D IMAGES
USING THE SAME

CROSS-REFERENCE TO RELATED APPLICATIONS

The present application claims priority under 35 U.S.C. § 119 to Korean Patent Application No. 10-2015-0083122 (Filed on Jun. 12, 2015), which is hereby incorporated by reference in its entirety.

BACKGROUND OF THE INVENTION

Field of the Invention

The present invention relates to an embedded system for implementing a fast 3D camera system based on structured light, the fast 3D camera system based on structured light, and a method for acquiring 3D images using the system.

Description of the Related Art

Generally, technologies for reconstructing a 3D image of an object using a camera may be largely classified into active and passive techniques. As a typical example of active techniques, there are laser triangulation and a structured light-based method. As a typical example of passive techniques, there is stereo vision. Active techniques are mainly used for research or industrial purposes because they may achieve higher precision than passive techniques.

Meanwhile, a 3D camera using structured light is a modification of a stereo camera. Unlike a stereo camera, in which two identical cameras are used, a 3D camera based on structured light is configured such that one camera is replaced by a projection device such as a beam projector. Accordingly, in a 3D camera system based on structured light, a pattern is projected onto an object using a projection device, the object onto which the pattern is projected is captured using an image capturing device such as a camera, and 3D information is acquired by analyzing the captured image.

In other words, because a stereo camera system passively uses features extracted from an image but a structured light-based camera system actively projects a pattern onto an object using a projection device and uses the projected pattern to distinguish features, it may have a faster processing speed and higher spatial resolution. Due to these advantages, the structured light-based camera system is widely used in various fields such as object modeling and recognition, 3D measurement, industrial inspection, reverse engineering, and the like.

However, conventional 3D sensors based on structured light have the following problems.

First, if precise control on the nanosecond level is not achieved between a camera and a device for projecting patterns, a time delay may occur, but it is difficult to implement such nanosecond-level precise control. Also, the longer it takes to project a pattern and capture an image, the longer it takes to perform 3D sensing, making it difficult to acquire 3D data of a moving object. Furthermore, if no embedded system is provided, communication processing by the OS (Operating System) of a PC may incur an additional delay.

Alternatively, if an additional processor and an embedded device are used to control a camera and a projector, additional memory is required for pattern codecs for projection. This may increase the size of the processor and embedded device and incur additional costs.

Besides, because a 2D sensor, especially for an industrial robot, has an intelligent solution but has low positioning accuracy, a lot of calibration processes are required. These calibration processes are not suitable for modern automated systems, which rapidly change, and may pose an obstacle to the spread of industrial automation.

In other words, a 3D sensor used for an industrial robot must have a tolerance of error less than 1 mm and fast processing time, but such a sensor is not only very expensive but also large and heavy. For example, AICON's smartSCAN has high precision but the weight is 4 kg, the price is 100,000 to 150,000 dollars, and the measurement distance ranges from 6 to 26 cm. Due to the weight, it is difficult to mount on a hand of a robot unless the robot is an expensive robot with a high payload, and thus it is fixed to the surrounding environment. That is, because it remains in a stationary state, its usability suffers. As another example of a 3D sensor, there is Faro's Laser Scanner Focus3D, which has a tolerance of 2 mm and weighs 5 kg. This sensor has low precision, although it is a laser sensor, and has the same problem as the AICON's sensor due to the weight thereof. Meanwhile, Imetric's IScan M300 V70 is a lightweight mobile system that weighs 2.4 kg and has a measurement range from 23.5 to 75 cm. This system is promoted as a lightweight mobile system for solving the above problems, but its weight is similar to or greater than the payload of a low-cost industrial robot, making it difficult to mount on the hand of the robot.

In consideration of the above-mentioned problems, the implementation of a high-precision, high-accuracy, and lightweight 3D sensor is necessarily required in order to enable robots to replace humans in cellular manufacturing and visual inspection, which have depended on human labor. Also, as techniques for accurately recognizing objects using 3D images have come to be widely used, the implementation of such a 3D sensor is required.

SUMMARY OF THE INVENTION

An object of the present invention is to provide a method and system that enable fast processing and cost reduction in a structured light based 3D camera. Specifically, the present invention intends to provide a fast embedded system, a fast 3D camera system based on structured light, and a method for acquiring 3D images using the system at low cost by providing precise control of image capturing using a camera, control of the exact time at which a pattern is projected using a projector (or a device for projecting images through a digital micro-mirror device (DMD)), and real-time generation of a pattern to be projected and by adding a Field Programmable Gate Array/Digital Signal Processor (FPGA/DSP) or a Micro Controller Unit (MCU) to a system, rather than adding additional memory to a PC.

The present invention provides a system and method in which a pattern may be generated in real time using an embedded system and a fast and lightweight 3D camera based on structured light may be implemented by synchronizing a camera with a projection device.

According to an aspect of the present invention, a pattern may be generated in real time in an embedded system rather than in a computing device, and the generated pattern may be transformed into a video signal and sent to a projection device. The embedded system includes a pattern generation module for generating the pattern in real time and a camera trigger module for converting a camera synchronization signal into a trigger signal and transmitting the trigger signal to a camera.

The pattern generation module may generate the pattern in real time in response to a command for projecting patterns and capturing images.

The command for projecting patterns and capturing images may be received from the computing device.

The embedded system may further include a communication module for receiving the command for projecting patterns and capturing images.

The embedded system may further include a transform module for transforming the generated pattern into the video signal in order to project the generated pattern using the projection device.

According to another aspect of the present invention, there is provided a fast 3D camera system based on structured light, which includes an embedded system for generating a pattern in real time upon receiving a command for projecting patterns and capturing images, a projection device for projecting the pattern, and a camera for capturing an image of an object onto which the pattern is projected.

The fast 3D camera system based on structured light may further include a computing device for sending the command for projecting patterns and capturing images to the embedded system and reconstructing a 3D image by receiving the captured image from the camera.

The computing device may include a user interface through which a user inputs a command and checks the captured image and the reconstructed 3D image and a communication module for sending the command for projecting patterns and capturing images to the embedded system and receiving the captured image from the camera through a continuous communication link, which is either a wired link or a wireless link.

The computing device may further include a storage unit for storing the captured image and the reconstructed 3D image.

The camera may be configured to be synchronized with the projection device through the trigger signal, to capture the image, which includes the pattern projected by the projection device, and to send the captured image to a computing device via a standard communication link, which is either a wired link or a wireless link.

According to a further aspect of the present invention, there is provided a method for acquiring a 3D image using a 3D camera based on structured light, in which a pattern is generated in real time in an embedded system rather than in a computing device, and in which the generated pattern is transformed into a video signal and is provided to a projection device. The method includes generating the pattern in real time in the embedded system, and generating a camera synchronization signal in the embedded system, converting the camera synchronization signal into a trigger signal, and transmitting the trigger signal to the camera.

The method may further include sending a command for projecting patterns and capturing images from the computing device to the embedded system via any one of a wired link and a wireless link.

The generating the pattern may be configured to generate the pattern in real time in response to the command for projecting patterns and capturing images.

The method may further include transforming the pattern into a video signal in the embedded system in order to project the pattern onto an object using the projection device.

The method may further include projecting the pattern onto the object and capturing an image of the object onto which the pattern is projected.

The method may further include reconstructing a 3D image from the captured image in the computing device.

The method may further include repeating the generating the pattern, the transforming the pattern, and the transmitting the trigger signal a number of times determined at an initial setup process.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

The present invention may be variously changed, and may have various embodiments, and specific embodiments will be described in detail below with reference to the attached drawings. However, it should be understood that those embodiments are not intended to limit the present invention to specific disclosure forms and that they include all changes, equivalents or modifications included in the spirit and scope of the present invention.

In the present specification, a singular expression includes a plural expression unless a description to the contrary is specifically pointed out in context. In the present specification, it should be understood that terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added.

Hereinafter, embodiments of the present invention will be described in detail with reference to the accompanying drawings. In the following description of the present invention, the same reference numerals are used to designate the same or similar elements throughout the drawings, and repeated descriptions of the same components will be omitted.

Figure 1:
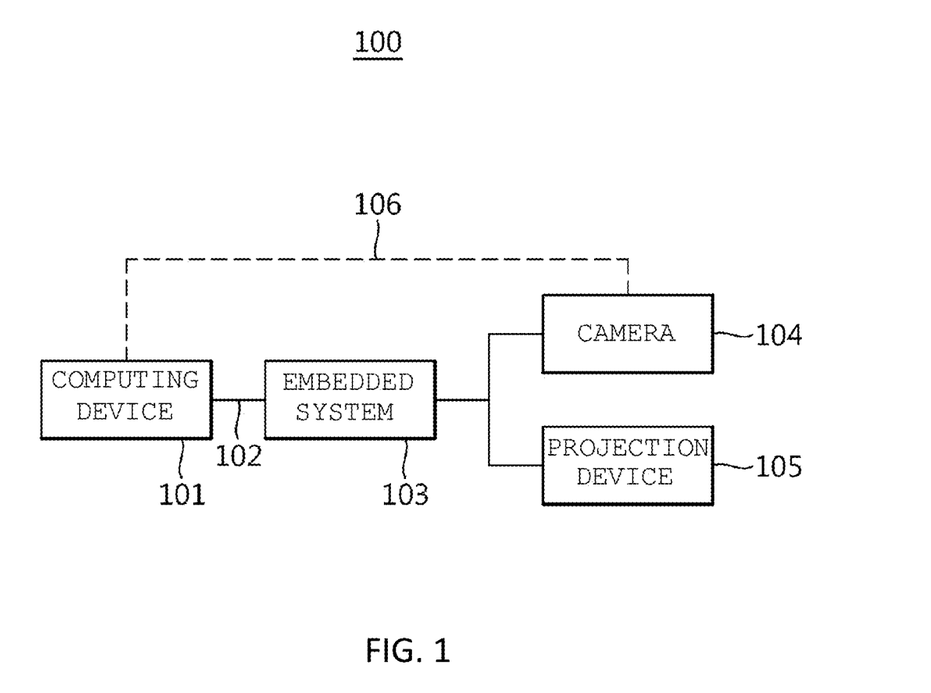
FIG. 1 is a schematic block diagram of a 3D camera system based on structured light.

FIG. 1 illustrates a schematic block diagram of a structured light-based 3D camera system. Referring to FIG. 1, a structured light-based 3D camera system 100 includes an embedded system 103, a camera 104, and a projection device 105. The system 100 may further include a computing device 101. Also, the system 100 may further include at least one of a communication link 102 between the computing device and the embedded system and a communication link 106 between the computing device and the camera.

In the structured light-based 3D camera system 100, the computing device 101 includes a user interface, which is capable of receiving input from a user in order to acquire a 3D image using the structured light-based 3D camera and of checking image data, and a communication interface, which is capable of sending a command for projecting patterns and capturing images to the embedded system and of receiving a captured image from the camera. Also, the computing device may further include a storage unit for storing initial settings, captured images, reconstructed 3D images, and the like. The computing device 101 may be any one of, for example, a PC, a laptop, a notepad, and various smart devices. In the computing device 101, when a user inputs a command for projecting patterns and capturing images through the user interface in order to acquire a 3D image, the command may be sent to the embedded system through the communication interface. Selectively, a user may set in advance the time at which a command for projecting patterns and capturing images is to be sent and the number of times the command is to be sent through the user interface. Also, the computing device 101 may receive a captured image, including the projected pattern, from the camera 104, and reconstruct a 3D image from the captured image.

The communication link 102 is a continuous communication link and a wired or wireless communication link for sending a command for projecting patterns and capturing images from the computing device 101 to the embedded system 103.

The embedded system 103 receives the command from the computing device 101 and generates pattern data in real time without using the internal memory thereof. Then, the embedded system 103 generates a pattern video signal for projection and a camera trigger signal for capturing the image of the object onto which the pattern is projected. The embedded system 103, the camera 104, and the projection device 105 may be variously arranged, and may be physically connected with each other. Through the physical connection, the pattern video signal and the trigger signal may be delivered to the projection device 105 and the camera 104, respectively.

The projection device 105 is a device that receives the video signal and projects the pattern, such as a projector or the like.

The camera 104 includes a CCD-type or CMOS-type image sensor. The camera 104 is synchronized through the trigger signal, whereby the shutter thereof is opened at the exact time and the open state is precisely maintained for the predetermined time period in order to capture the image of an object, including the pattern projected by the projection device.

The communication link 106 between the computing device and the camera is a continuous communication link and a wired or wireless communication link for sending the captured image, which includes the projected pattern, from the camera 104 to the computing device 101.

Figure 2:
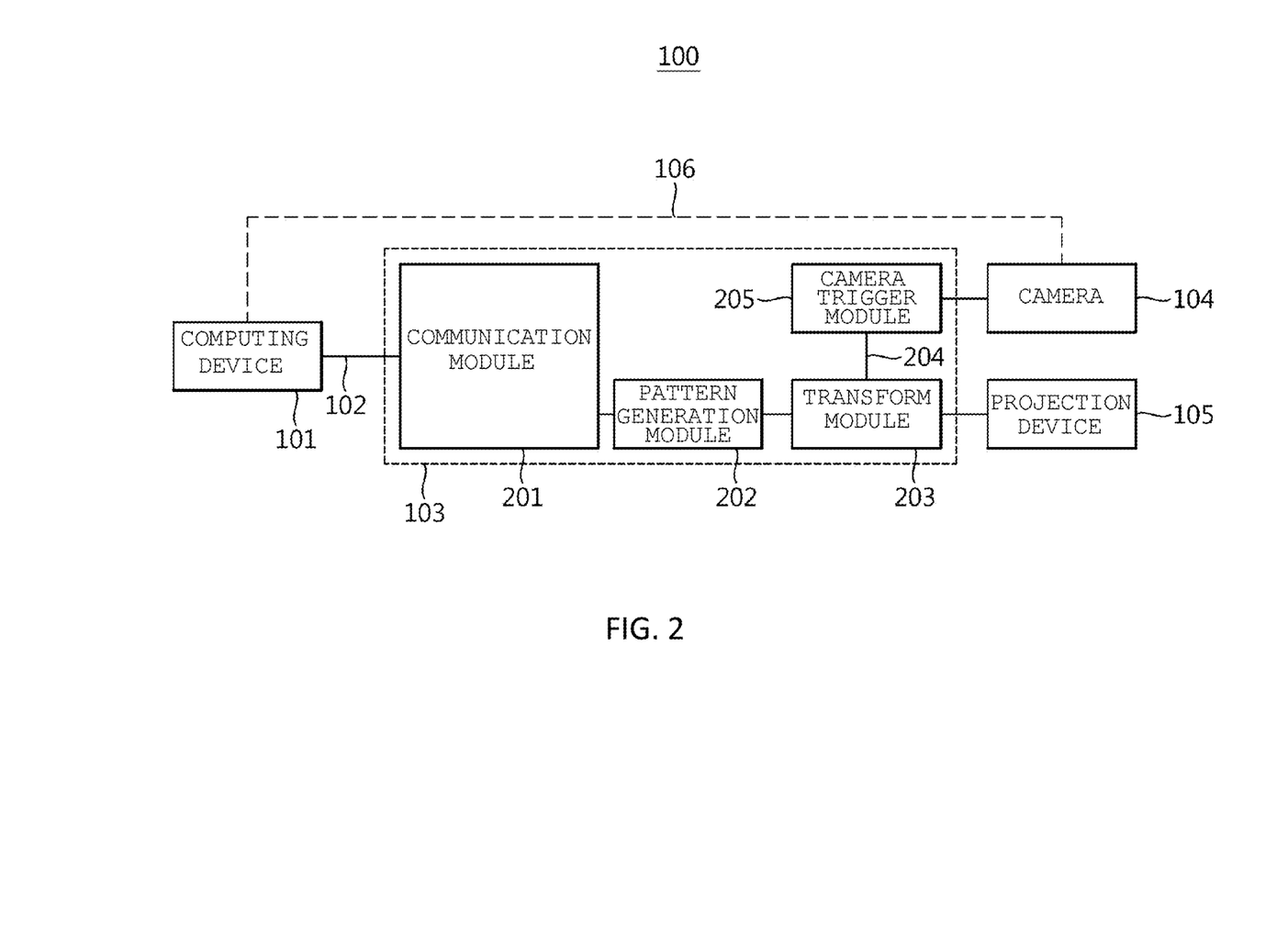
FIG. 2 is a schematic diagram illustrating the internal configuration of an embedded system.

FIG. 2 illustrates a schematic diagram of the internal configuration of an embedded system. The embedded system 103 may be implemented based on a Field Programmable Gate Array (FPGA), a Digital Signal Processor (DSP), a microcontroller, or the like. The embedded system 103 includes a pattern generation module 202 and a camera trigger module 205. The embedded system 103 may further include a communication module 201 and a transform module 203. Also, the embedded system 103 may further include a software link 204, through which a camera synchronization signal generated in the transform module 203 is sent to the camera trigger module 205.

The communication module 201 serves to receive a command for projecting patterns and capturing images from the computing device 101, and may be implemented through UDP/TCP, serial communication, and the like.

The pattern generation module 202 generates a pattern in real time when receiving the command for projecting patterns and capturing images from the computing device 101. This module may generate various patterns, which are calculated and processed using codecs in the embedded system 103.

The transform module 203 transforms the generated pattern into the video signal to be sent to the projection device. For example, the pattern may be transformed into five VGA signals (Vertical synchronization, Horizontal synchronization, R Signal Data, G Signal Data, and B Signal Data). At the same time, a camera synchronization signal, which is to be sent to the camera trigger module 205 through the software link 204, is generated.

The camera trigger module 205 converts the received camera synchronization signal into a trigger signal and transmits the trigger signal to the camera 104. The trigger signal is transmitted from the embedded system 103 to the trigger pin of the camera 104, whereby the capture of an image by the camera can be perfectly synchronized with the projection of a pattern.

Figure 3:
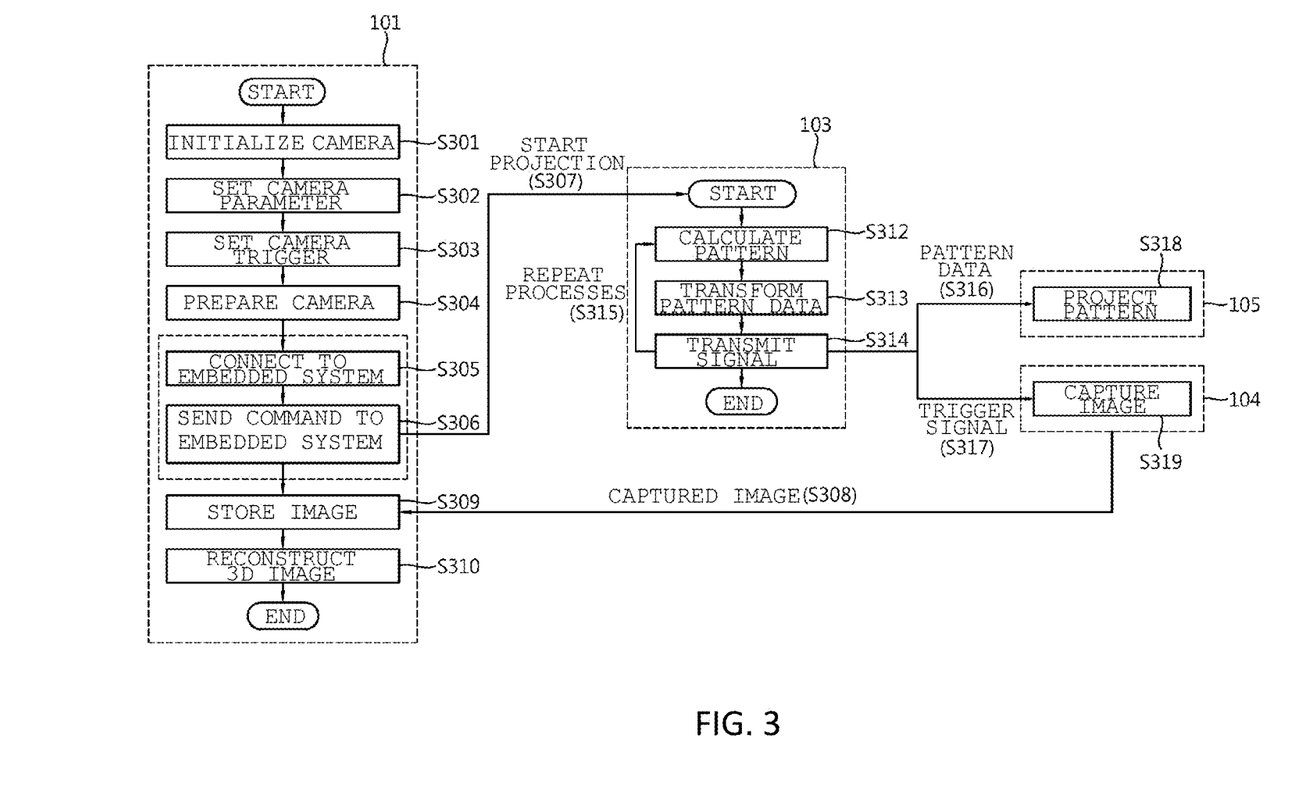
FIG. 3 is a flowchart of the processes performed in a 3D camera system based on structured light.

FIG. 3 illustrates a flowchart of the processes performed in a structured light-based 3D camera system 100. Referring to FIG. 3, in the structured light-based 3D camera system, the following processes are performed in order to acquire the 3D image of an object.

A user may input camera-related values and parameter values through the user interface screen provided by the computing device 101. Specifically, first, the initial value is set according to the kind of the camera 104 at step S301. Next, a camera parameter adapted to the structured light-based 3D camera system 100 is input and adjusted at step S302. Finally, a trigger is set at step S303 in order to synchronize the capture of an image and the projection of a pattern. When the above input process has been completed, the camera waits for a trigger signal at step S304.

Then, the computing device 101 sets a communication port and a communication speed, connects to the embedded system 103 at step S305, and transmits a predefined signal (that is, a command for projecting patterns and capturing images) to the embedded system 103 at step S306.

The embedded system 103 receives the signal (the command for projecting patterns and capturing images) and calculates pattern data at step S312. Then, the embedded system 103 transforms the generated pattern into a video signal at step S313. For example, it may be transformed into five VGA signals (V Sync, H Sync, R Signal Data, G Signal Data, and B Signal Data). Simultaneously with the transformation, a camera synchronization signal is generated. The generation of the pattern data, the transformation of the pattern data and the generation of the synchronization signal are repeated a predefined number of times at step S315. The transformed pattern is sent to the projection device 105, and the trigger signal (S317), generated from the synchronization signal, is transmitted to the camera 104 at step S314.

The projection device 105 receives the transformed pattern (S316) and projects the pattern onto a target object at step S318, and the camera 104 captures the image of the object, onto which the pattern is projected, at step S319.

The camera 104 sends the captured image to the computing device 101 at step S308 through the communication link 106 between the computing device and the camera. The computing device 101 stores the received image in a storage medium at step S309 and constructs a 3D image by decoding the stored image at step S310.

Meanwhile, a user may perform the following processes through a user interface screen provided by the computing device 101. The user may perform an initial setup process such as setting the initial value of a camera, inputting camera parameters, setting triggers, and the like. When the initial setup process is completed, the user may send a command for projecting patterns and capturing images to the embedded system by selecting a pattern projection/camera capture button or the like in the user interface screen. Selectively, the user may set in advance the time at which the command for projecting patterns and capturing images is to be sent and the number of times the command is to be sent, whereby the command may be automatically sent the designated number of times at the designated time.

The user may monitor the processes performed in the embedded system 103, the camera 104, and the projection device 105 in real time through the user interface screen.

Also, the user may check the object image, including the pattern, which is received from the camera 104, through the user interface screen. Also, the user may check the 3D image of the object, acquired through the 3D image reconstruction process, in the user interface screen. Here, in order to increase the clarity of the reconstructed 3D object image, the brightness, chroma, and contrast of the image may be adjusted, and an unnecessary background may be deleted from the image.

Experimental Example

Figure 4:
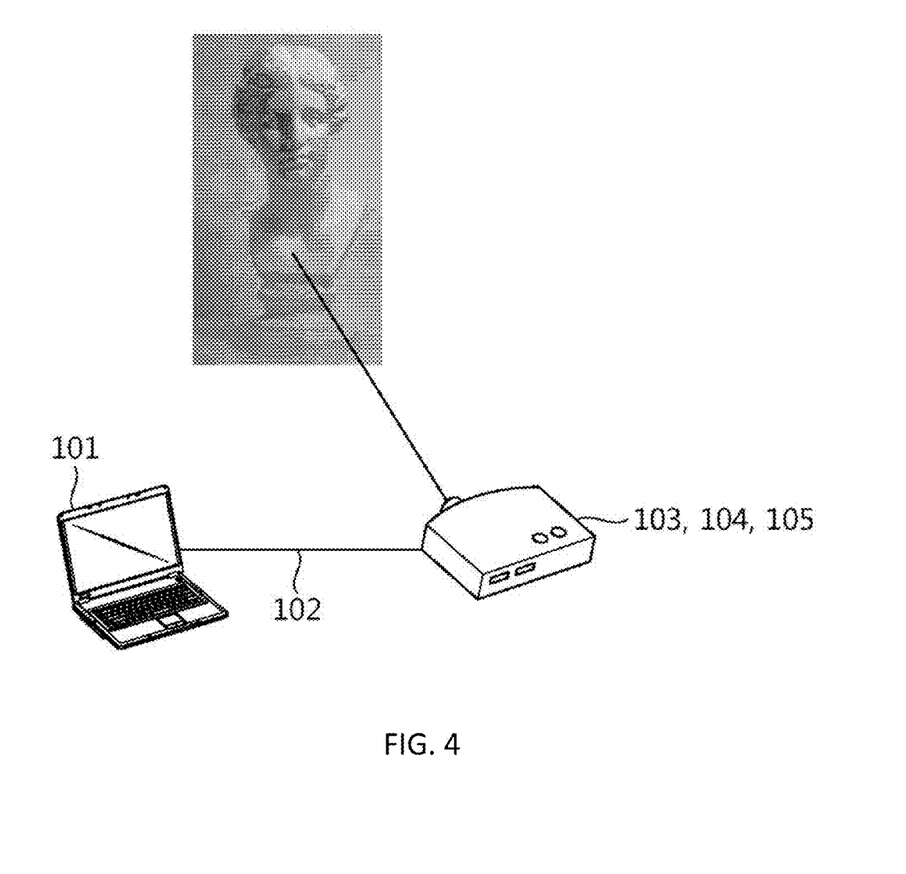
FIG. 4 is a schematic diagram illustrating an experimental system.
Figure 5:
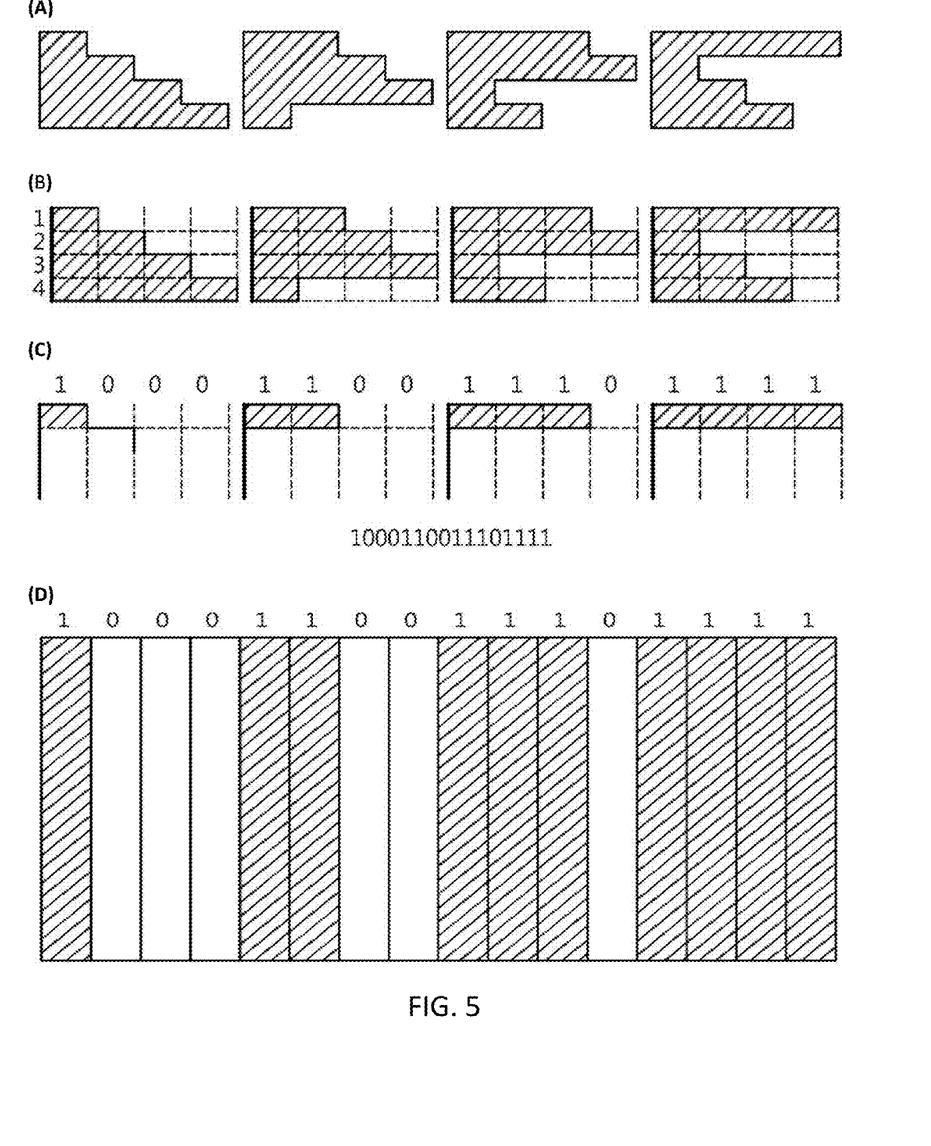
FIGS. 5A to 5D illustrate an example of the process of generating a pattern to be projected.
Figure 6:
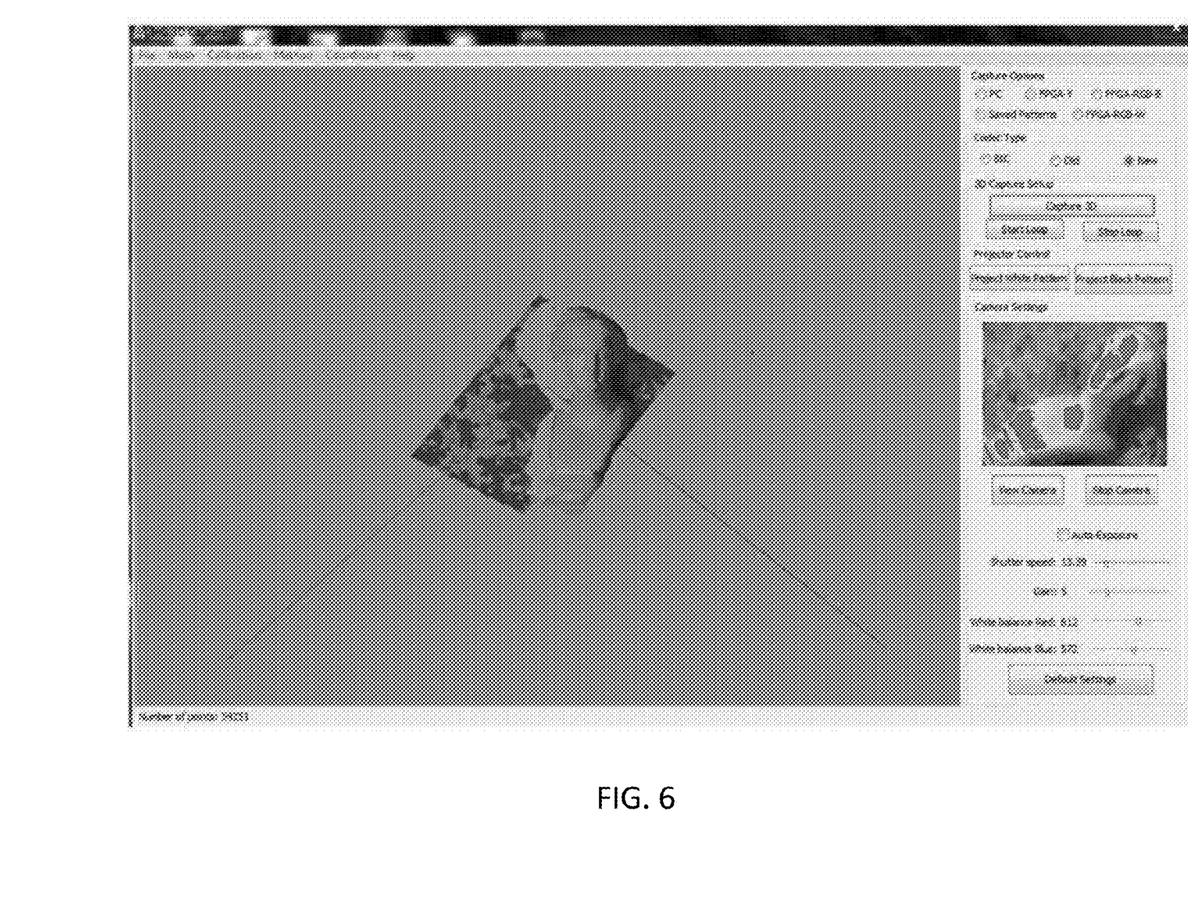
FIG. 6 shows a user interface screen in which a 3D image, reconstructed in an experiment, is displayed.
Figure 7A:
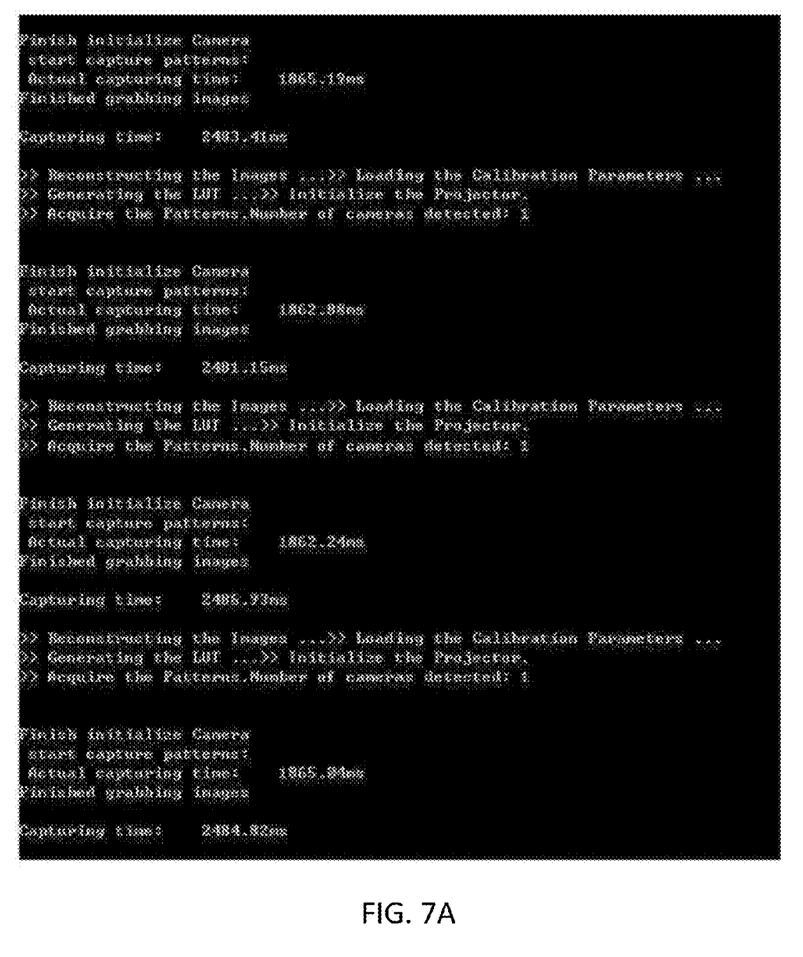
FIG. 7A shows the total time taken to capture an image when a conventional experimental method is used.
Figure 7B:
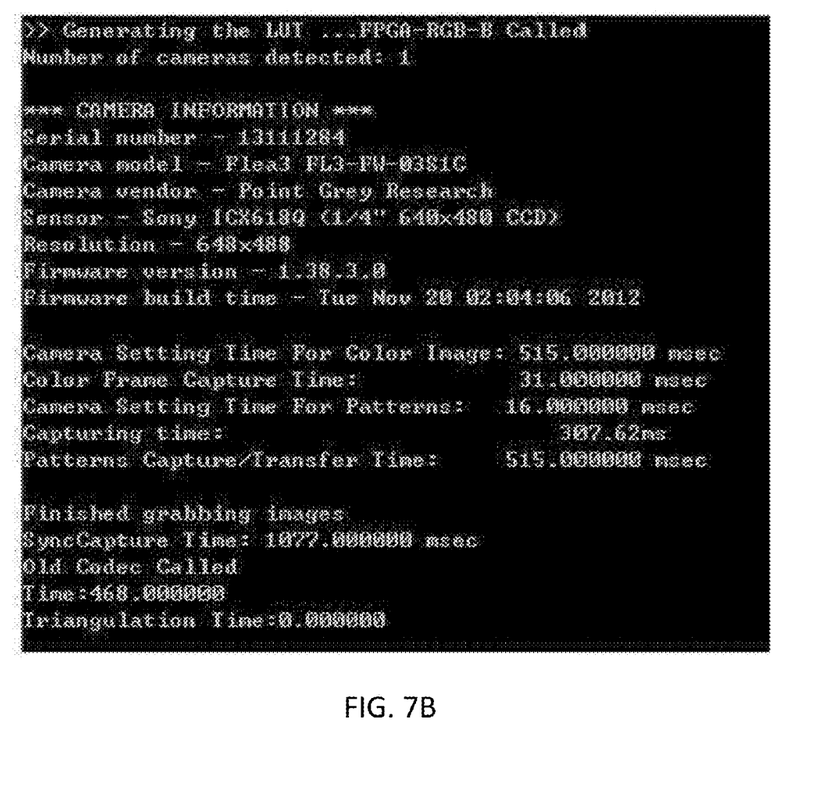
FIG. 7B shows the total time taken to capture an image when an experiment is performed according to the present invention.

An exemplary system of the present invention, configured as described above, is implemented and compared with a conventional method. A laptop is used as the computing device, and the laptop and the embedded system are connected with each other via a cable. The embedded system is implemented as a Field Programmable Gate Array (FPGA), and a camera and a projector corresponding to the projection device are fixed in a mount together in order to conduct the experiment. Meanwhile, in order to implement the conventional method, a connection between a PC and a camera and a connection between the PC and a projector are made without an embedded system. Also, a plaster figure, shown in FIG. 4, is used as a 3D object to be captured. The experimental example of the present invention generates a pattern in real time using Hierarchical Orthogonal Coding (HOC), by which the length of code signals is divided into a few layers and each layer includes orthogonal codes recursively (reference: S. Lee, J. Choi, D. Kim, et al., "Signal Separation Coding for Robust Depth Imaging Based on Structured Light", Proceedings of the IEEE International Conference on Robotics and Automation, 2005, pp. 4430-4436, and Korean Patent Application Publication No. 10-2013-0000356). FIGS. 5A to 5D show an example of the process of generating a pattern to be projected. Referring to the example, first, a grid is generated as shown in FIG. 5A. In order to encode the grid into a binary number, the grid is divided into sections as shown in FIG. 5B. Then, the grid is encoded into a binary number (black: 1, white (absence): 0) as shown in FIG. 5C. Finally, a pattern to be projected is generated based on the encoded value, as shown in FIG. 5D. When an image is captured, the pattern generated through the above process is projected, and the image of the object onto which the pattern is projected is captured. The pattern projected in the experiment is an example, and the system of the present invention may generate various patterns in real time in addition to the pattern shown in FIG. 5D. FIG. 6 shows an image reconstructed from the captured image in the laptop. FIG. 7A and 7B respectively show a screen in which the total time taken to capture the image in the experimental example of the conventional method is displayed and a screen in which the total time taken to capture the image in the experimental example of the present invention is displayed. In the experimental example, when the conventional method is used, the time taken to capture the image is 1865 ms, but the time is 1077 ms in the system of the present invention, that is, the time is reduced by about 57% compared to the conventional method.

Through the embodiments, it is confirmed that the present invention is advantageous in that image processing and signal processing may be quickly performed by selecting a system in which a high-performance Micro Controller Unit (MCU) or an FPGA/DSP is installed. In the case of a conventional 3D sensor based on structured light, precise synchronization may not be performed due to the limitation of the OS of a PC. However, because the present invention does not install any OS on the embedded system, signal processing may be quickly performed. Also, because the next pattern to be projected is generated while the current pattern is projected, a fast speed may be maintained. Accordingly, a large number of patterns may be projected in a short time. Consequently, fast processing enables the measurement of a quickly moving object in 3D, and the measurement may be performed more precisely. Additionally, because patterns may be generated in real time in the embedded system, there is no need to use additional memory, thus reducing the weight and expense of the system.

The embedded system, the fast 3D camera system based on structured light, and the method for acquiring 3D images using the system according to the present invention relate to an embedded system, the precision, the accuracy, and the speed of which are improved by applying the design and implementation of an embedded device based on a Micro Controller Unit (MCU) or a Field Programmable Gate Array (FPGA), a fast 3D camera system based on structured light, and a method for acquiring 3D images using the system. Accordingly, the present invention may solve problems related to the weight and speed of the conventional 3D sensor based on structured light.

According to the present invention, because a pattern is quickly generated in real time in the embedded system, it is not necessary to process the pattern in the OS of a computing device. Accordingly, there is no need to use or allocate memory for the pattern in the OS of the computing device. Also, while a pattern is projected, the pattern to be projected next is generated, thus maintaining a high speed. In other words, because the process of generating and sending a pattern is performed in the embedded system, projection may be performed more quickly than when the pattern is generated by and sent from a PC. Therefore, the present invention may use more patterns than the existing method, thus achieving high precision. Alternatively, when the patterns that are the same as those in the conventional method are projected, the speed of the system may be improved with high real-time performance.

As described above, various embodiments of the present invention have been disclosed. Although specific terms have been used in the present specification, these are merely intended to describe the present invention, and are not intended to limit the meanings thereof or the scope of the present invention described in the accompanying claims. Therefore, those skilled in the art will appreciate that various modifications and other equivalent embodiments are possible from the embodiments. Additionally, because some of the steps described above may be performed in any order, the steps may be performed in a different order. Also, some of the steps may be omitted, or other steps may be further included.

What we claim:

1. A structured light 3D imaging system, comprising:
   an embedded system to calculate first pattern data for a first pattern in real time in response to a command received from a computing device and generate a video signal from the first pattern data, the computing device being separate from the embedded system;
   a projection device to receive the video signal from the embedded system and project the first pattern onto an object in accordance with the video signal; and
   a camera to capture an image of the object with the first pattern projected thereon by the projection device.

2. The 3D imaging system of claim 1, wherein the first pattern data is not stored in a memory of the embedded system.

3. The 3D imaging system of claim 2, wherein the imaging system includes the computing device and the computing device comprises:
   a user interface through which a user may cause the computing device to transmit the command to the embedded system and through which the user may monitor generation of a 3D image of the object by the computing device; and
   a communication interface to transmit the command to the embedded system and to receive the image of the object captured by the camera.

4. The 3D imaging system of claim 1, wherein the embedded system calculates second pattern data for a second pattern while the projection device projects the first pattern onto the object.

5. The 3D imaging system of claim 1, wherein the embedded system further generates a trigger signal and transmits the trigger signal to the camera to synchronize the projection of the first pattern onto the object by the projection device with the capture of the image of the object with the first pattern projected thereon by the camera.

6. The 3D imaging system of claim 1, wherein the embedded system includes a codec to calculate the first pattern data.

7. The 3D imaging system of claim 1, wherein the embedded system does not include an operating system.

8. The 3D imaging system of claim 1, wherein the embedded system comprises at least one of a field programmable gate array, a digital signal processor, and a micro controller.

* * * * *